Aug. 27, 1963    E. E. EHINGER    3,101,677
AUTOMOBILE HANDLING APPARATUS
Filed Dec. 17, 1959    11 Sheets-Sheet 1

INVENTOR.
Eldon E. Ehinger

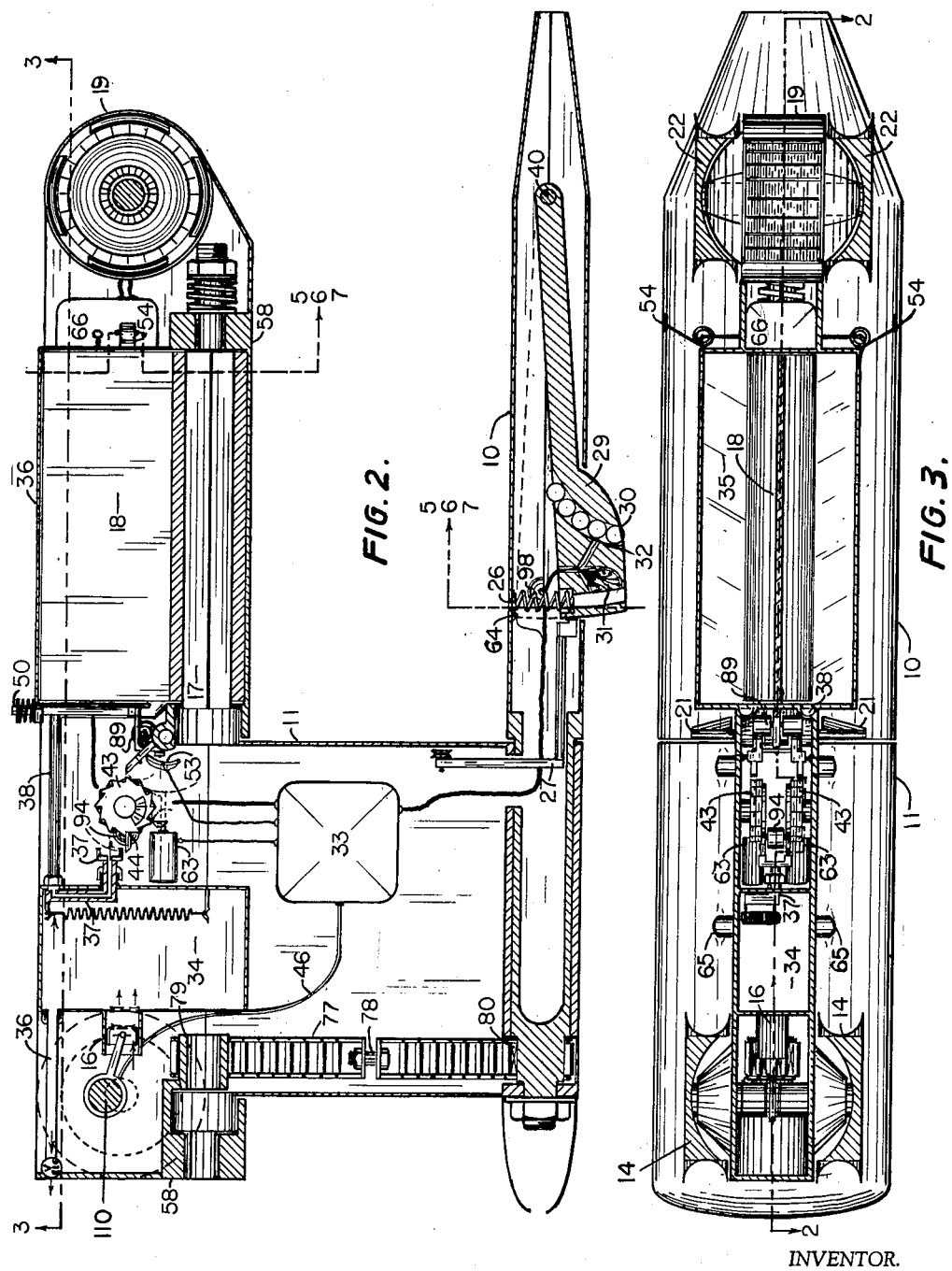

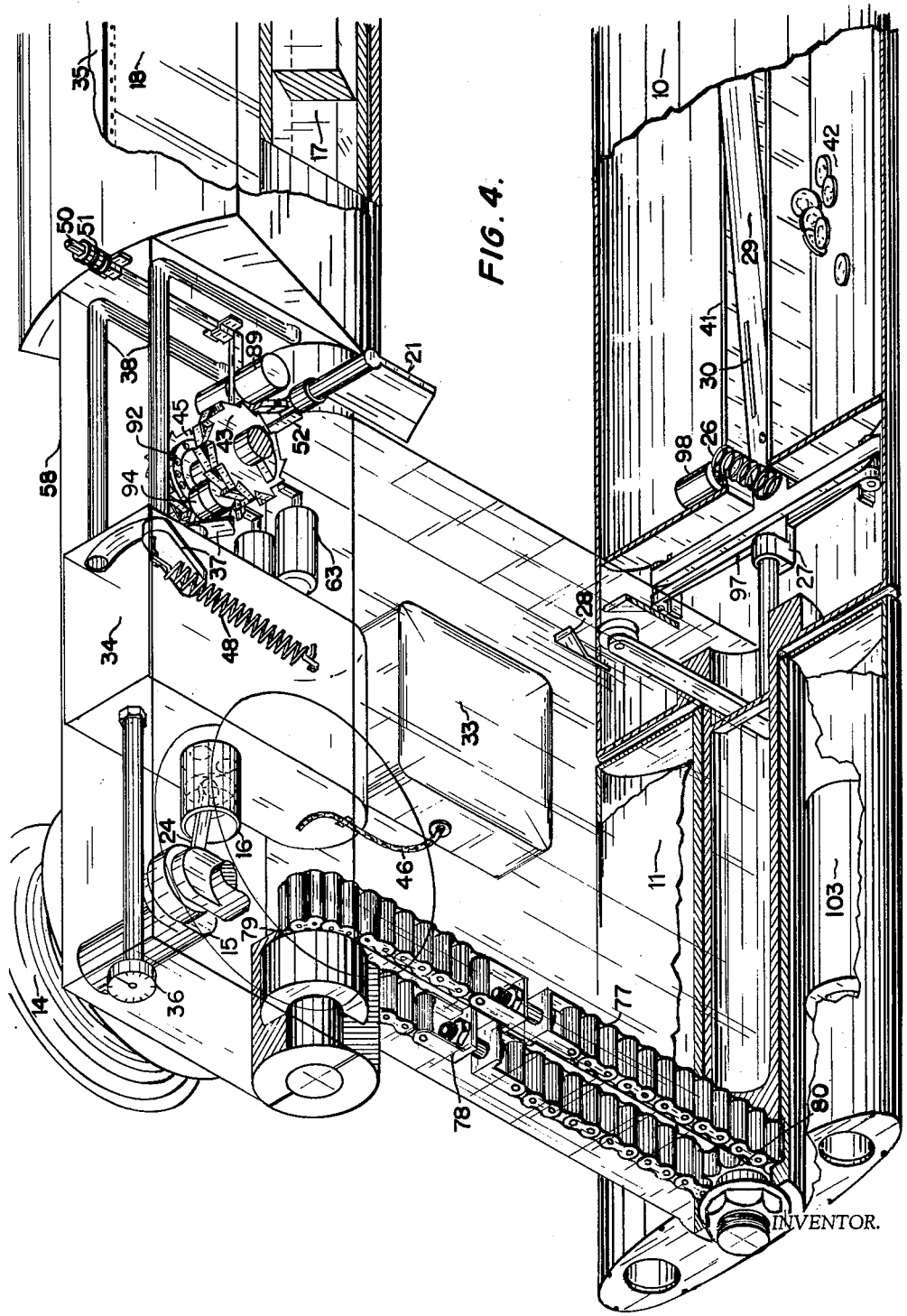

INVENTOR.
Eldon E. Ehinger

Aug. 27, 1963  E. E. EHINGER  3,101,677
AUTOMOBILE HANDLING APPARATUS
Filed Dec. 17, 1959  11 Sheets-Sheet 5
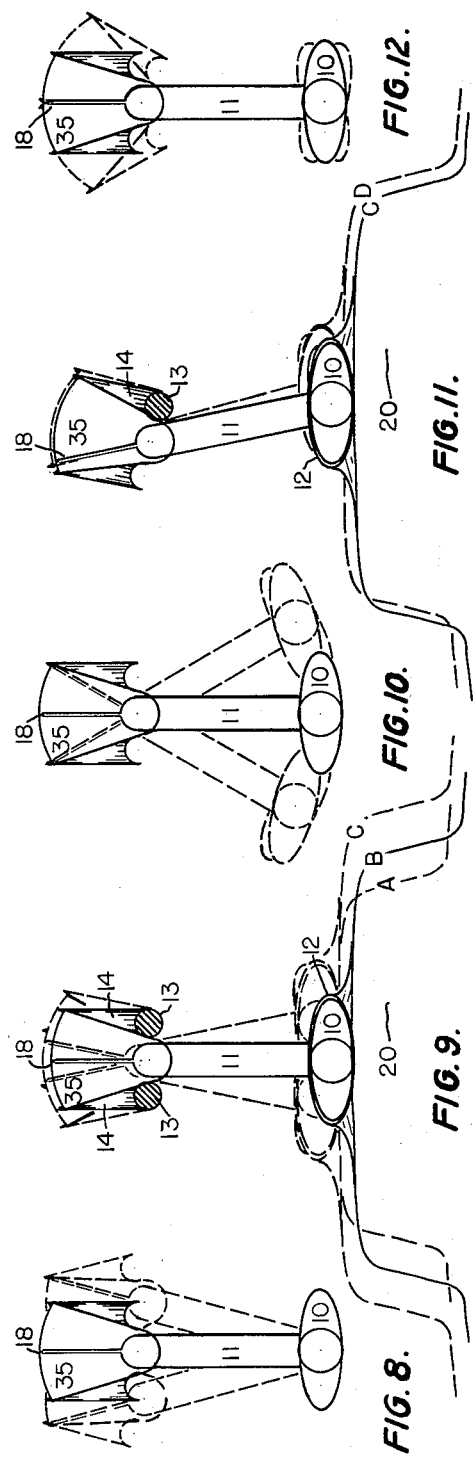
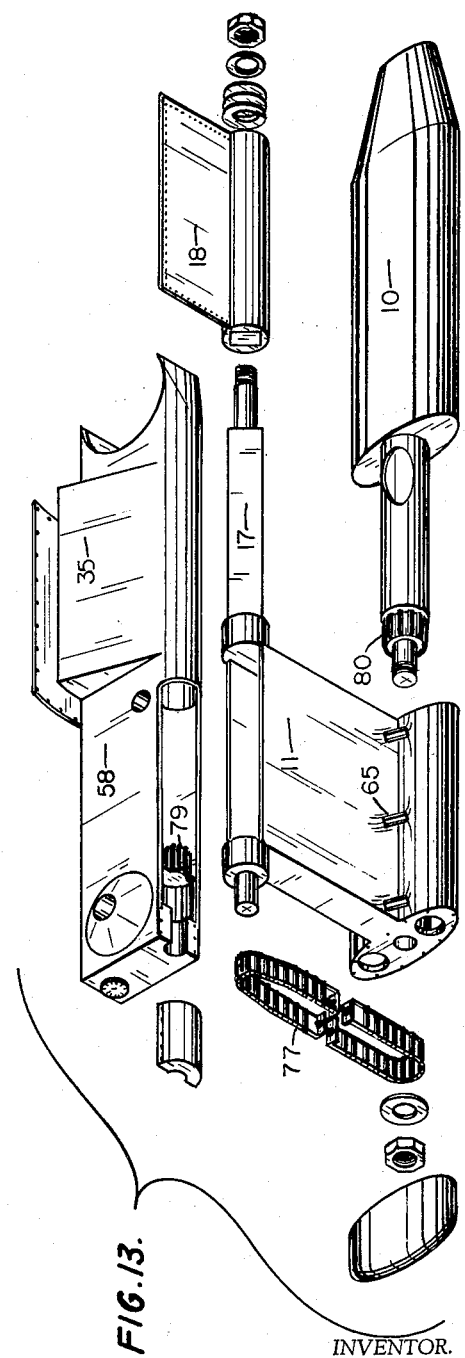
INVENTOR.
Eldon E. Ehinger Aug. 27, 1963 E. E. EHINGER 3,101,677
AUTOMOBILE HANDLING APPARATUS
Filed Dec. 17, 1959 11 Sheets-Sheet 6

INVENTOR.
Eldon E. Ehinger

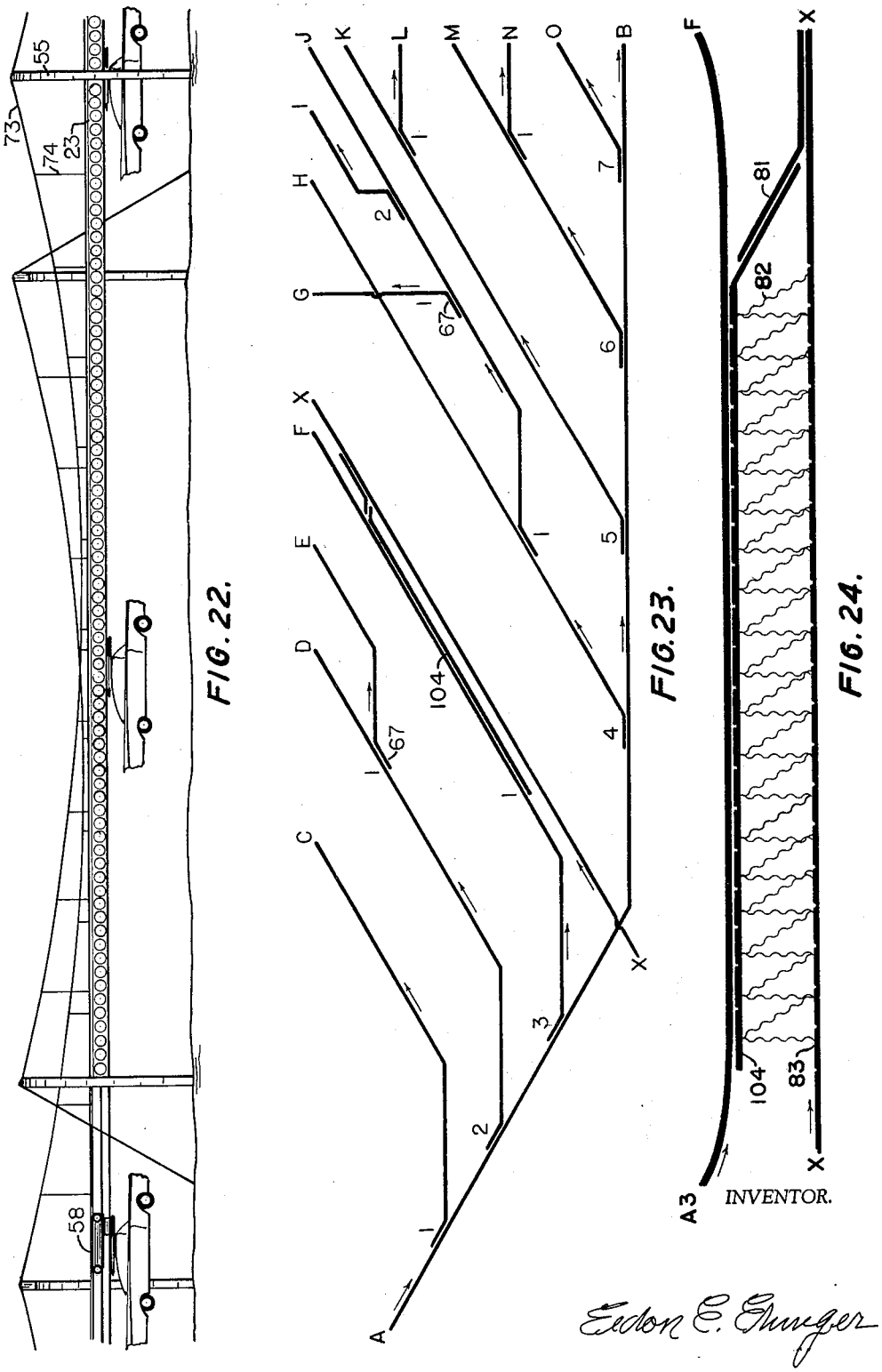

Aug. 27, 1963 E. E. EHINGER 3,101,677
AUTOMOBILE HANDLING APPARATUS
Filed Dec. 17, 1959 11 Sheets-Sheet 9

INVENTOR
Eldon E. Ehinger

Aug. 27, 1963  E. E. EHINGER  3,101,677
AUTOMOBILE HANDLING APPARATUS
Filed Dec. 17, 1959  11 Sheets-Sheet 10

INVENTOR.
Eldon E. Ehinger

Aug. 27, 1963  E. E. EHINGER  3,101,677
AUTOMOBILE HANDLING APPARATUS
Filed Dec. 17, 1959  11 Sheets-Sheet 11

INVENTOR.
Eldon E. Ehinger

United States Patent Office 3,101,677
Patented Aug. 27, 1963

3,101,677
AUTOMOBILE HANDLING APPARATUS
Eldon E. Ehinger, P.O. Box 43, Centreville, Va.
Filed Dec. 17, 1959, Ser. No. 860,136
20 Claims. (Cl. 104—91)

The present invention generally relates to an automobile handling apparatus and basically includes a supporting mechanism generally in the form of a track from which passenger vehicles may be suspended and propelled to a desired location and then discharged onto a roadway surface for use of the vehicle in a normal manner with all of the controls of the apparatus being substantially automatic and foolproof so that the driver of the vehicle and the occupants may completely forget about operation of the vehicle. This application relates to improvements in the apparatus disclosed in copending application Serial No. 760,773 filed September 12, 1958, now abandoned.

One of the major problems facing those officials responsible for smooth movement of traffic is the ever increasing volume of traffic and the ensuing traffic jams which are extremely wasteful of time and fuel, to say nothing of personal irritation of the various drivers due to delay. Attempted solutions have been undertaken with the present practice involving the construction of extremely expensive controlled access highways or expressways interconnecting large metropolitan areas or extending generally in the areas having a high density of vehicular traffic. Some of these expressways are toll roads in which the individual motorist using the facilities actually pays for the use of such facilities in a direct toll.

Since there is an ever increasing number of vehicles on the roads, the problem will become more and more severe. Another factor is the extreme high initial cost and high upkeep cost of expressways, turnpikes and the like. Further, movement of the traffic on such highways is still subject to human error which sometimes results in fatal crashes. For example, uninterrupted driving at substantially a constant speed becomes monotonous and quite often a driver experiencing these conditions will temporarily fall asleep and this quite often results in serious consequences.

In order to overcome the various objections of a highway system as presently being practiced, it is the primary object of the present invention to provide a traffic system in which an overhead mono-rail track is provided with there being supported from the mono-rail track a plurality of trolleys having means thereon for supportingly engaging individual automobiles whereby each trolley will have an electric propelling motor mounted thereon for picking up electrical energy from the track and propelling the trolley and the vehicle suspended therefrom along the track at a predetermined speed and in predetermined spaced relation to similar vehicles thereby eliminating the necessity of the driver of the vehicle or the occupants thereof from being concerned with the operation of the vehicle thereby enabling such travel time to be more efficiently used since the vehicle occupant could read a paper or magazine or conduct a certain amount of work while being transported.

It is another object of the present invention to provide an arrangement whereby the occupants of the vehicle may control the movement of the vehicle in relation to the suspending track so that the vehicle will automatically be side-tracked and discharged from the overhead track at the desired destination with the occupants of the vehicle also having means for depositing payment for the transportation of the vehicle all while in uninterrupted transit.

Yet another object of the present invention is to provide an automobile handling apparatus in which the vehicle is suspended from an overhead trolley which is rollingly supported by the track and which drives itself on the track by an electric motor with the energy being picked up by the trolley, the electric motor being adjustable as to speed from a central control station so that the vehicles suspended from the device will maintain constant and punctual travel time between any two given points as well as their proper spaced relationship during movement of the vehicles along the track.

A still further object of the present invention is to provide an automobile handling apparatus in accordance with the preceding objects in which the movement of the automobile is automatically controlled thereby eliminating the element of human judgment and possibility of error during high speed automobile travel thereby eliminating accidents and maintaining the vehicles at a predetermined spaced relation thereby increasing the volume of automobiles travelling over a single track.

Another important object of the present invention is to provide an automobile handling apparatus in which there is provided a structural arrangement for collecting tolls and also tabulating such tolls while the automobile with its passengers are in uninterrupted travel thus eliminating the time normally lost in paying tolls.

A still further important object of the present invention is to provide a device in accordance with the preceding objects including means for mechanically controlling the travel of the automobile thereby rendering it possible to make more efficient use of a given area of real estate for most effective use of a right-of-way by a more dense automobile arrangement.

Yet another object of the present invention is to provide an economical means of automobile handling so that the automobile may be moved and propelled over, under or around congested areas or other areas that would normally slow down traffic.

Yet a further object of the present invention is to provide an automobile handling apparatus utilizing a much simplified running mechanism and constant, clean nongaseous motive power to render it economically capable of sustaining its construction, operation and maintenance within the costs that normally would be spent by the vehicle owners in driving the vehicles over the road for a distance equivalent to the distance travelled.

Another salient feature of the present invention resides in the construction of the automobile with a suspension tube permanently mounted thereon at a preedtermined height whereby such tube may be used with the automobile handling system of the present invention and other future suspended automobile parking and storage apparatus so that all of such vehicles employing the device will be readily engaged by the handling apparatus.

Other features of the present invention are the provision of an automobile handling apparatus which will not deprive the automobile owner from normal use of the automobile but will provide a means of conveying the automobile from one location to the other with the automobile having all of the comforts and accessories normally provided such as heaters, air conditioners, radios and the like with the entire assembly being relatively simple but novel in construction, highly efficient, safe, and generally well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal sectional view of one of the trolleys suspended from the mono-rail and adapted to engage the vehicle for supporting the same with the view being taken substantially upon the longitudinal center line and upon a plane passing along section line 2—2 of FIGURE 3;

FIGURE 3 is a longitudinal, plan sectional view taken substantially upon a plane passing along section line 3—3 of FIGURE 2 illustrating further structural details of the trolley and particularly the drive mechanism and supporting wheels therefor;

FIGURE 4 is a perspective view of the forward end portion of the trolley with portions of the housing broken away and shown in a transparent manner for illustrating the relationship of the various controlling components;

FIGURES 8, 9, 10, 11 and 12 are schematic rear elevational outlines of the main pivoted components of the trolley for illustrating the tilting and pivoting movement and relationships of the components of the trolley;

FIGURE 13 is an exploded group perspective view of certain of the components of the trolley;

FIGURE 22 is a side elevational view of the mono-rail track and the mechanism for supporting the track;

FIGURE 23 is a schematic plan view of the trackage of the system illustrating generally the manner in which the vehicle may be switched to various locations depending upon the particular letter and number code;

FIGURE 24 is a schematic plan view of the traffic merging track arrangement;

Figure 1:
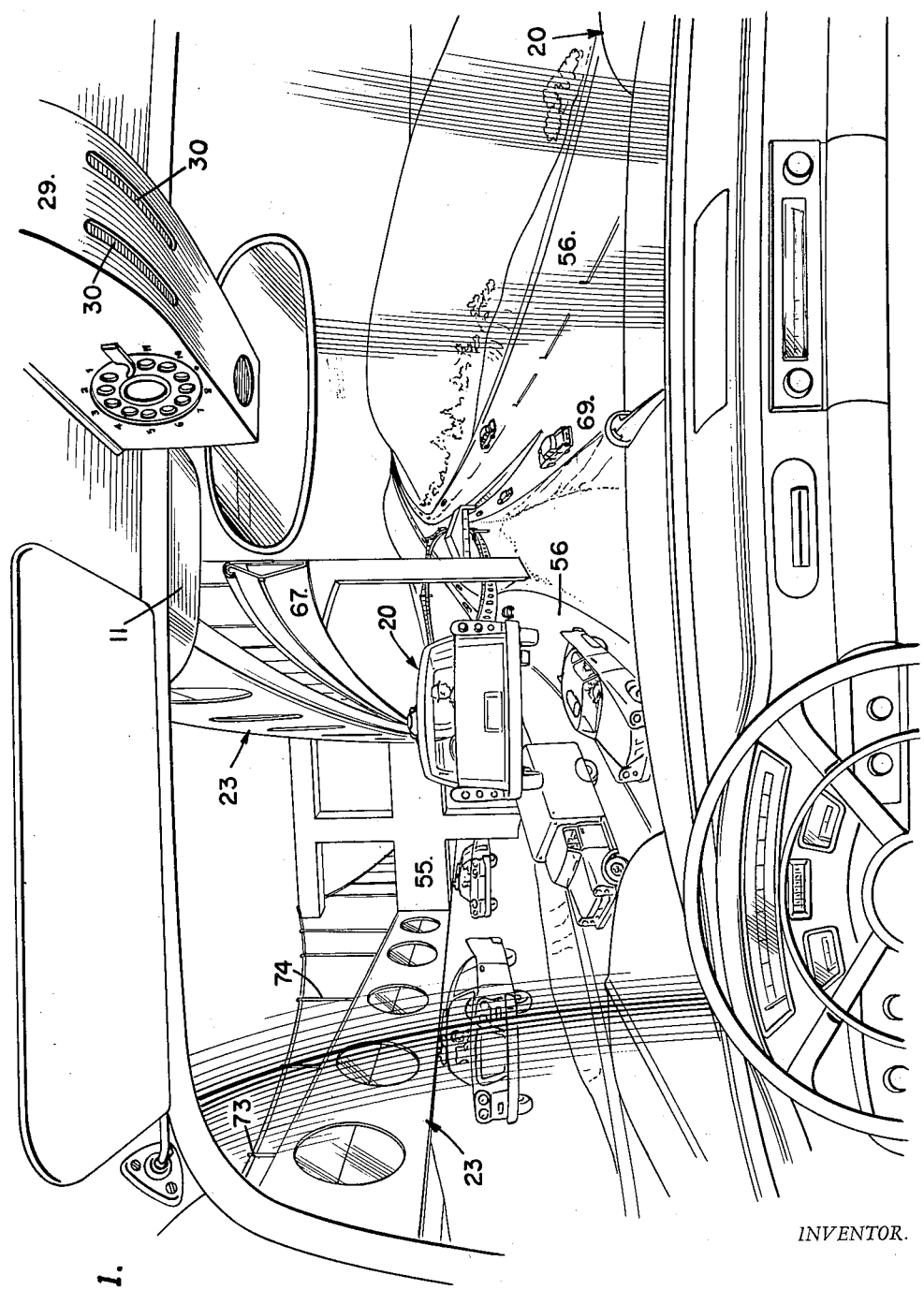
FIGURE 1 is a panoramic perspective view taken generally from the driver's position from the interior of an automobile suspended from the automobile handling apparatus of the present invention illustrating the relationship of the automobiles being handled by the present invention to other conventional highways and the relationship between other automobiles being handled by the apparatus.

Referring now specifically to the drawings and particularly to FIGURE 1, the numeral 20 generally designates the automobile which is supported from a cable suspended monorail track generally designated by numeral 23. The automobile 20 is of generally conventional construction and it is noted that a multiplicity of automobiles is suspended from the monorail track. Each of the vehicles is modified to a certain extent in that it is provided with a suspending tube 12 at the top thereof which connects the vehicle to a trolley car 58 mounted on the monorail track 23 with the trolley car including a carrying arm 10 which has a housing 11 and which is adapted to be inserted into the suspension tube 12 on the automobile 20.

The panoramic view shown in FIGURE 1 illustrates the provision of a conventional highway 56 together with an entrance or take-off roadway 69 and also illustrates the relationship of an exit track 67 and illustrates supporting towers 55 and suspension cables 73 and suspension rods 74 for the monorail track 23.

The center portion of the interior of the roof of the automobile 20 is provided with a cut-out to accommodate latch 29 of the trolley's carrying arm and also illustrates toll slots 30 within the latch of the arm and also illustrates the relationship of a destination dial 31. FIGURE 1 represents an automobile or a group of automobiles in transit and travelling in suspended relation from a trolley car 58 that is running upon a cable suspended monorail track 23 and illustrates the carrying arm protruding latch 29 and the toll receiving slots 30 and the destination selecting dial 31 located thereon. There is provided a screen vent from which thermostatically controlled air can be circulated into the passenger compartment of the automobile 20 while it is in the state of transit.

Figure 7:
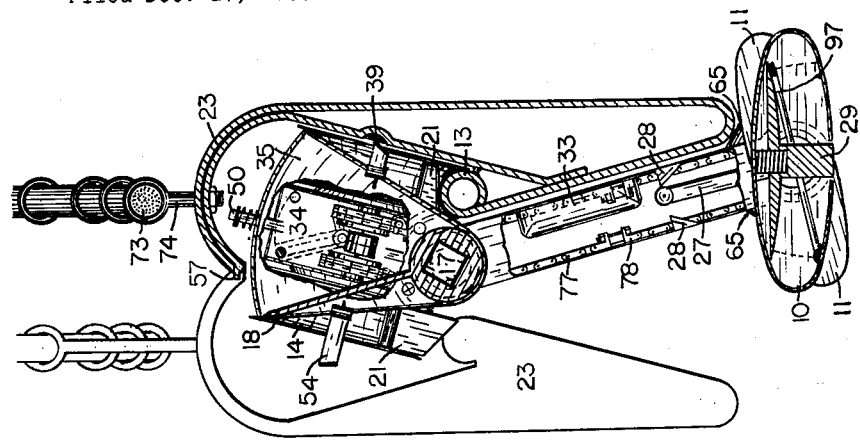
FIGURE 7 is a view similar to FIGURES 5 and 6 but with the trolley in the other tilted position.
Figure 6:
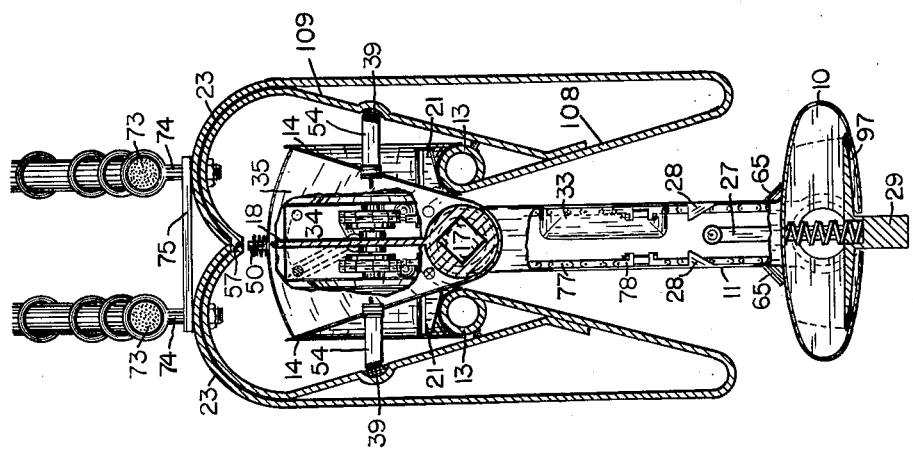
FIGURE 6 is a view similar to FIGURE 5 but with the trolley shown in an exact mid-position.
Figure 5:
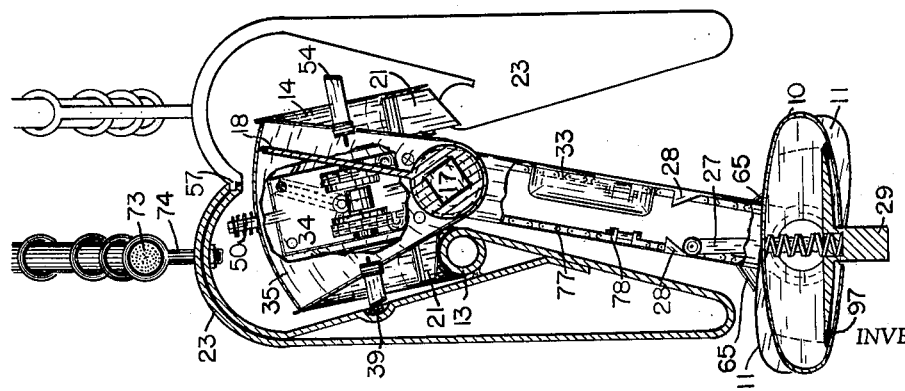
FIGURE 5 is a rear elevational view of the trolley with portions thereof in section illustrating the tilt of the trolley as it runs upon a left mono-rail track and approaches an adjoining right mono-rail track for switching tracks.

FIGURES 2–4 of the drawings are directed specifically to the trolley car 58 and the structural features thereof which will effectively suspend a passenger vehicle or automobile 20 and will automatically control the movement of the vehicle. In considering these figures of the drawings, reference is also made to FIGURES 5–7 in which the numeral 13 designates the tubular or cylindrical running surface of the monorail track 23. As shown in these figures of the drawings, the monorail track 23 is connected to the suspending cable 73 by virtue of the suspending rods 74. Spacers 75 retain the tracks 23 in properly spaced relation at the switching points only as shown in FIGURE 6. As illustrated in FIGURE 6, there are two cylindrical running surfaces 13 only at the point of switching. Each surface 13 is supported by a downwardly inclined and reversely bent plate 108 that is an integral part of the monorail track 23. The plate 108 is braced by brace plate 109 and plates 108 and 109 have the upper ends thereof curved to form the upper protective, tilt locking and anti-track jumping portion of the monorail track 23 and the lower end of plate 109 is connected rigidly to the plate 108 thereby rigidifying track 23. Also, the brace plate 109 is provided with a longitudinal indentation receiving the variable electric power band 39 as illustrated in FIGURES 5–7.

The trolley car 58 is provided with a generally horizontally extending carrying arm 10 including a housing 11 with there being an air compressor 16 mounted therein which is driven from an eccentric 110 forming a part of the crankshaft axle 15 which supports the forward idler wheels 14 which are provided with a transverse semi-circular groove which engages the surface 13 of the monorail track 23. Power is transmitted from the eccentric 110 to the air compressor by virtue of the connecting rod 24.

The housing 11 extends vertically upwardly from the arm 10 and is supported from a longitudinal pivot shaft 17 having a tilting fin 18 extending upwardly therefrom with the tilting fin being received in close fitting relation within a chamber 35 as shown in FIGURES 2 and 3.

The air compressor 16 discharges into an air pressure storage tank 34 which has air passageways 38 extending therefrom. The air passageways are communicated with the tilting chamber 35 on opposite sides of the fin 18. The air pressure tank 34 is provided with a pressure relief outlet 36 and also provided with a rocker valve 37 which is swingable from a position closing one of the passageways 38 and is held in both of its positions by an overcenter snap spring 48 which will hold the rocker valve 37 in either of its extreme positions for selectively closing one of the passageways 38 and opening the other of the passageways 38. The shaft 17 is provided with a square or polygonal portion rigid with the tilting fin 18 so that when the fin 18 swings laterally in the chamber 35, the housing 11 and arm 10 will swing about the longitudinal axis of shaft 17.

The rear of the trolley car is provided with a variable speed electric propelling motor 19 having rear power wheels 22 connected to the armature thereof for engaging the surface 13 of the track 23 for propelling the trolley car 58 at variable speeds. Disposed forwardly of the motor 19 is the electrical junction box 66 for the trolley car and extending laterally from the junction box 66 from each side thereof is a pick up finger or trolley 54 for engagement with the variable electric power bands 39 for supplying electrical energy to the junction box 66.

The carrying arm 10 on the trolley car is provided with a pivotal latch 29 supported from a pivot pin 40 and swingable from a position interiorly of the arm 10 to a position with the rear end thereof forming an abutment and the latch 29 is urged to a latching position by a spring 26 and is retracted by virtue of an unlatching rocker 27 of generally inverted T-shaped configuration and which is pivotal by virtue of inclined cams or rocker tracks 28 engaging the upper end of the unlatching rocker 27 and pivoting it thus moving the cross arm 97, which is of a flexible nature, and the latch 29 upwardly. The latch 29 is provided with the toll slots 30 and is also provided with toll slot tabulating contacts 32 that record each toll payment by completing a circuit to the trolley car's main control panel 33 which activates the double control wheel holding solenoid 94 and latch freeing solenoid 98.

The money or tolls which is inserted through the tolls slot 30 will fall off of the top surface of the latch 29 and will fall over the top edges of the guide walls or fences 41 for the latch 29 and be deposited in the money retainers or vaults 42 forming a portion of the carrying arm 10. Also disposed in the trolley intermediate the tank 34 and the tilting fin chamber 35 are two cog control wheels 43 having fixed thereto reversed destination cog wheels or units 45. The cog control wheels 43 are each provided with a valve rocker arm 44 for engaging with rocker valves cross arm lug 85. Also, the trolley is provided with tripping fins 21 which contact the track and have tripper dogs 47 connected therewith for engaging the cogged wheels to rotate them in increments depending upon the number of movements of the tripping fins 21 so that upon a predetermined number of movements of the tripping fins 21, the valve rocker arms 44 will operate to trip the rocker valve. 37 over and cause the trolley car to tilt onto a branch or exit track.

An odometer cable 46 is connected with the axle 15 of the idler wheels 14 which transmits the revolutions of the idler wheels into the main control panel 33. A track lock 50 is mounted for reciprocation vertically on the fin chamber 35 and is provided with a spring 51 urging the track lock up into engagement with the monorail track 23. When the track lock 50 is extended, the trolley cannot tilt in relation to the monorail track from the position in which it is in. In order to unlock the track lock, there is provided an unlocking bar 52 disposed in the path of movement of tripper dogs operated by the tripper fins 21 thus requiring both of the tripper fins to be tripped by the contact with adjoined tracks in a simultaneous manner before the lock will be released sufficiently to allow the trolley car frame to tilt from one monorail track and onto and into another monorail track. There is also provided tabulating contacts 53 for tabulating the movement of the tripping fins 21. This information is relayed to the main control panel 33.

The trolley car 58 is provided with stabilizers 65 interconnecting the horizontal and vertical components of the housing 11.

The upper frame part of the trolley and the lower pivoted carrying arm 10 are connected by a compensating chain 77 which encircles a frame sprocket 79 and an arm sprocket 80 with there being an adjustable coupling 78 to take up any slack in the chain. The chain 77 serves the purpose of keeping the pivoted carrying arm 10 in a level and horizontal plane as the trolley car's upper frame is pneumatically tilted from side to side, that is, from track to track and also has the reverse action of keeping the trolley car's upper frame tilted when the carrying arm is being held in this level or horizontal plane by the vertical gravitational force of a suspended automobile carried by the arm 10. Also, trip delaying solenoids 89 and control wheel holding solenoids 94 are illustrated and the freeing solenoid 98 for the latch is also provided. The square portion of the shaft 17 where it inserts through the tilting fin 18 allows the shaft to be securely fixed to the tilting fin for transmitting all of the transverse movement of the tilting fin and still allowing the shaft to have some horizontal clearance without effecting the tilting fins pressure seal at any time. The unlatching rocker 27 can rock either way when its roller tipped upright portion contacts either of the rocker tracks 28 located within the vertical portion of the arm housing. The latch 29 may be moved down into latched position by the latch spring 26 and stabilized and guided between the guiding fences 41 that also form the money vaults 42 for storage of the cash tolls as they emerge from the toll slots 30.

The destination solenoids 63 are positioned forwardly of the control wheels and particularly in front of the inner unit cogs so that their plungers can engage the cogs and force each control wheel back one unit for each impulse received when the solenoids have a complete grounded circuit. The two trip delaying solenoids 89 are positioned so that their plungers can protrude under the track locks offset 111 to keep the lock locked and also to prevent the second tripper dog from its normal control wheel tripping movement, as the second tripping fin contacts and drags upon an adjoined track. On the inner face of the control wheels there is seen holding sockets 92 and positioned between the control wheels so that their ball tipped plungers 112 will engage the sockets are two control wheel holding solenoids 94 that are always activated when the passenger toll is paid. The latch freeing solenoid 98 is located within the carrying arm 10 and so positioned that its plunger shall protrude over the carrying arm latch 29 to prevent it from completely unlatching whenever the passenger toll is not paid, in which case the unlatching rockers complete rock or movement shall be partially absorbed into the rockers flexible cross arm 97.

Also positioned in the trolley is an air conditioning unit 103 having its intake forward and conditioned air exhaust through the arm latch 29 into the passenger compartment of the vehicle with the air conditioning unit 103 being schematically illustrated as being located in the housing.

FIGURES 5–7 illustrate the trolley car in three different positions as it will run upon the cable suspended monorail track 23 and are generally taken along the lines 5, 6 and 7 of FIGURE 2 with portions of the device cut-away for clarity.

In FIGURE 5, the position and extent of tilt of the trolley car is shown as it runs loaded upon a left monorail track and approaching an adjoining right monorail track. In FIGURE 6, the position of the trolley car is shown as it is exactly midway in its tilt from one monorail track onto another, and in FIGURE 7 the trolley's car position is shown as it runs completely tilted without any weight on a left monorail track.

The carrying arm 10 is generally elliptical in shape and it keeps its level horizontal plane behind the housing 11 throughout the complete tilt of the trolley car by means of the compensating chain 77 which directly connects the trolley car's upper tilting portion to the carrying arm. Also, the chain has a reverse action to the above mentioned which is effective while the carrying arm 10 is held to the level and horizontal plane by the vertical gravitational force of the suspended automobile and this force also tends to align the vehicle directly under the monorail tracks tubular running surface 13 and the monorail tracks adjustable suspension rods 74 that suspend the monorail track from the suspension cables 73. In this condition, the compensating chain shall keep the trolley car's upper frame in that tilted position until an additional second force is applied such as the pneumatic air within the tilting chamber.

The unlatching rocker 27 is carried in the carrying arm with its upright portion extending upwardly into the vertical portion of the arm housing and the flexible cross arm 97 is positioned below the latch 29 so that, as shown in FIGURE 7, whenever the trolley car assumes a complete unloaded tilt, said upright portion of the unlatching rocker will contact and be rocked by either the left or right rocker tracks 28 to cause its cross arm 97 to raise the latch 29 upwardly into flush relationship to the carrying arm 10.

As previously stated, the pivoting shaft 17 is square where it passes through the tilting fin which operates within the tilting chamber 35. As pneumatic air pressure is allowed to enter the tilting chamber 35 on either side of the fin 18 through either of the two air passgeways 38 from the tank 34, this will cause the trolley car's upper portion along with the wheels mounted thereon to tilt upon a monorail track to a degree and extent that the air pressure overcomes the vertical gravitational pull of the automobile 20 suspended below the carrying arm 10. As shown in FIGURE 5 where the pneumatic air pressure is being allowed to enter the tilting chamber on the left side of the tilting fin, this will cause the trolley car's upper portion to tilt upon a left monorail track. Further, by this action, it is seen that the vehicle or automobile is afforded with air cushioned transport. In FIGURE 6, the air pressure is shown being allowed to enter the tilting chamber on the right side of the tilting fin, while the pressure trapped on the left side of the fin is allowed to slowly escape through the rocker valves air escape passage 49 and thereby cause the trolley car's upper frame to tilt to the right onto a right monorail track as in FIGURE 7 where the trolley car is shown unloaded and in a complete right tilt.

The tripping fins 21 are pivotally mounted on each side of the trolley car's upper frame so as to hang down below the wheels of the trolley car sufficiently to contact and drag over all opposite monorail tracks that have been so adjoined, aligned and positioned for the trolley car to tilt onto. Therefore, as in FIGURE 5 where the left tripping fin is shown dragging upon the left track, the right tripping fin is hanging down sufficiently to contact and drag over the approaching right monorail track and in so doing will trip the trolley car's right control wheel forward one unit by virtue of the dogs or lugs 47.

In FIGURE 6, both tripping fins 21 are shown in contact and dragging upon both a right and left monorail track surface which action will pull down the track lock 50 and allow the upper portion of the trolley car to tilt over onto an opposite track as in FIGURE 7 where the left tripping fin 21 is now shown hanging down to contact and drag over all opposite monorail tracks that have been so adjoined, aligned and positioned for the trolley car to tilt onto. Thus, in order for the trolley car tilting portion to tilt from the left position as illustrated in FIGURE 5 to the right position as illustrated in FIGURE 7, the lock 50 must be retracted due to the particular construction of the monorail track 23.

The main control panel 33 is located within the vertical portion of the housing 11 and the stabilizers 65 are arranged on each side of the housing to contact the lower portion of the monorail track whenever the trolley car is unloaded and in a complete tilt so as to provide a third stabilizing point of engagement for free running upon a mono-rail track when in the idle position. This relationship of components is shown in FIGURE 7 which is the unloaded position of the trolley car. The trolleys or pick-ups 54 are positioned one to each side and are of sufficient extent to make electrical power transmitting contact with the power band 39 onto which it is tilting before its opposite trolley loses contact with the variable electric power band from which it is tilting. Thus, at least one of the trolleys 54 will be engaged with the pick-up band at all times. As illustrated in these views, the mono-rail track 23 has an upper loop from which the trolley car cannot tilt out of while the track lock 50 is in the uppermost locked position and this loop is so extended over the running surface 13 so as to afford the exact ample clearance when joined and held against an opposite track by the spacer 75 and are held in exact alignment with each other by a tongue and groove assembly 57 designed into said loops whereby the trolley car may smooth tilt from or onto joined tracks with this joint forming a smooth transition for movement of the trolley.

FIGURES 8–12 are schematic rear elevational outlines of the trolley car's main pivoted components to illustrate their tilting and pivoting movements in their relationship to each other throughout these movements.

In FIGURE 8, the trolley car's lower pivoted carrying arm 10 is shown in a stationary position while its housing 11, tilting fin 18 and its upper tilting chamber 35 are shown to the left and to the right in their maximum movements in relation to the carrying arm 10 with the carrying arm 10 maintained stationary.

In FIGURE 9, the same four main pivoted components of the trolley car are shown to the left and to the right in their approximate position in relation to the trolley car's idler wheels 14 which are seen here as being in contact and running upon either a right or a left or both mono-rail track running surfaces 13 while carrying the suspended automobile 20 by its suspension tube 12. The transverse movements of the automobile are shown as it is suspended by the trolley car from the left mono-rail track, position A, from both mono-rail tracks, position B, and onto or from the right mono-rail track, position C.

In FIGURE 10, the trolley cars upper tilting chamber 35 is held stationary while its arm housing 11, tilting fin 18 and lower carrying arm 10 are shown to the left and right in their maximum movements in relation to the chamber 35 thus showing the scope of movement of the components when the chamber 35 is held stationary.

In FIGURE 11, further movements of the pivoted components of the trolley car are shown in relation to the idler wheel 14 on the right track running surface 13 from their loaded and automobile suspending tilt to their complete unburdened and automobile releasing or receiving tilt, position D, as can be seen from position D, whereas the automobile is running conventionally, its suspending tube 12 can freely encase or allow the rtolley car's carrying arm to withdraw freely from it.

In FIGURE 12, the trolley car's housing 11 and tilting fin 18 are shown stationary while the chamber 35 and arm 10 are shown to the left and right in their maximum movements in relation to the central components which are held stationary.

FIGURE 13 is an exploded view of the components of the trolley car which constitute the main pivoted components along with the compensating chain 77 and taking this view into consideration along with the schematic views, the orientation of the pivoted components of the trolley car are clearly set forth.

Figure 17:
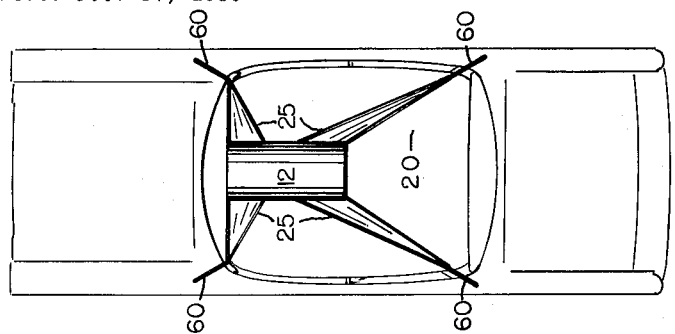
FIGURE 17 is a top plan view of the construction of FIGURE 15 illustrating the relationship of the suspending tube to the automobile.
Figure 16:
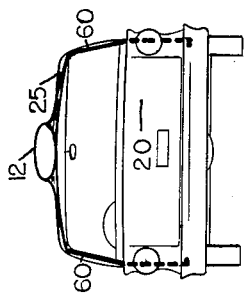
FIGURE 16 is a rear elevational view of the construction of FIGURE 15.
Figure 15:
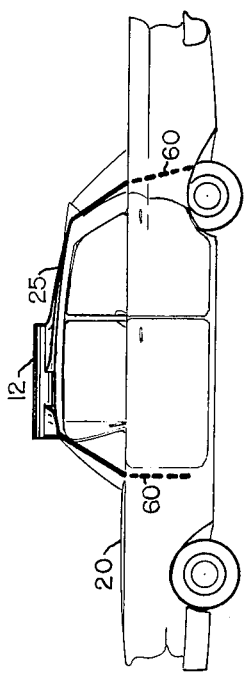
FIGURE 15 is a side elevational view of the suspension tube illustrating generally the manner in which it is mounted onto a vehicle.
Figure 14:
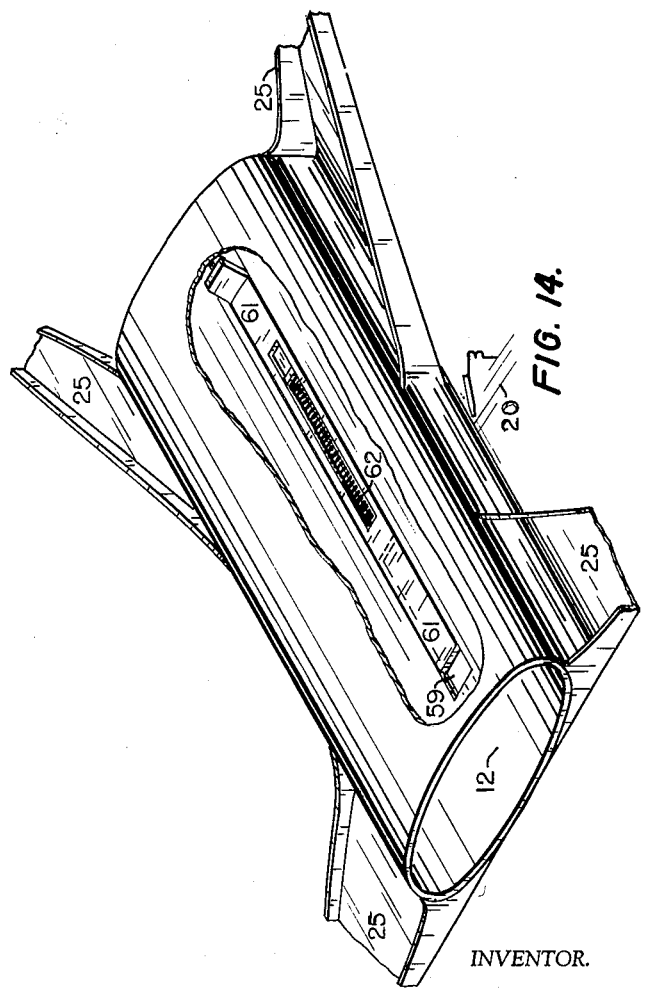
FIGURE 14 is a perspective view with portions broken away of a suspending tube mounted on top of the automobile.

FIGURE 14 illustrates the details of the suspending tube and FIGURES 15–17 illustrate the orientation of the suspending tube in relation to the automobile 20. The suspending tube 12 is affixed to or provided on the top of the automobile 20 or similar vehicle at the same given height above the entrance and exit roadways that the trolley cars carrying arm 10 travels suspended above said roadways, in order to use the transportation system. As will be evident from these views, the suspending tube has been constructed so that it may be readily, economically and unobtrusively affixed to the conventional automobiles that are in present-day use but automobiles could also be constructed that would have the suspending tube built into it as an integral part.

The suspending tube 12 is provided with an elongated rectangular cut-out opening 59 into the passenger compartment of the automobile to which it is affixed that will accommodate the trolley car's carrying arm latch 29 when in suspended transit and this opening is equipped with a flush mounted sliding cover 61 that will be automatically closed, by virtue of its closing spring 62 when the carrying arm 10 and latch 29 is withdrawn from the tube. Also, when the carrying arm 10 enters the suspending tube 12 the cover 61 will be automatically opened by the arm 10 engaging the upturned end of the cover 61. The slide cover 61 will seal the cut-out opening 59 against the weather as the carrying arm 10 is withdrawn and the vehicle may then be operated conventionally without any possibility of leaks.

The suspending tube 12 shown for conventional automobiles 20 is attached with four rigid strengthening channels 25 that conform to the curvature of the automobile and extend outwardly along the surface of the automobile and they are fastened terminally securely to the automobile frame by tie-down cables 60 without interfering with the automobile door openings. Of course, when the vehicle is constructed with the suspension tube 12 incorporated therein, the anchoring elements may be incorporated into the vehicle body construction without any of the anchoring mechanism being observable from the exterior surfaces.

Figure 18:
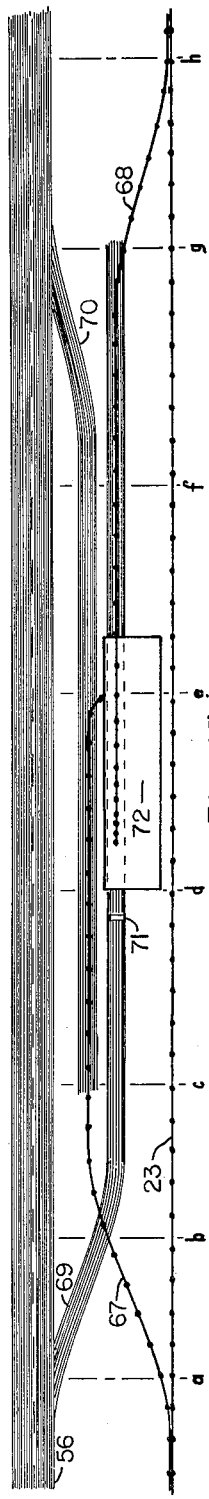
FIGURE 18 is a top plan view, schematic in nature, illustrating a switch arrangement whereby an automobile may enter into or leave the mono-rail tracks.
Figure 19:
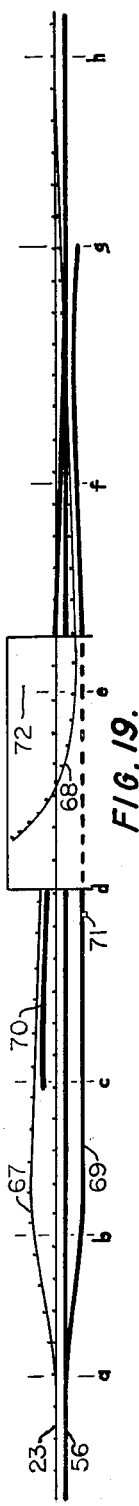
FIGURE 19 is a side elevational view, of schematic nature, of a station.
Figure 20:
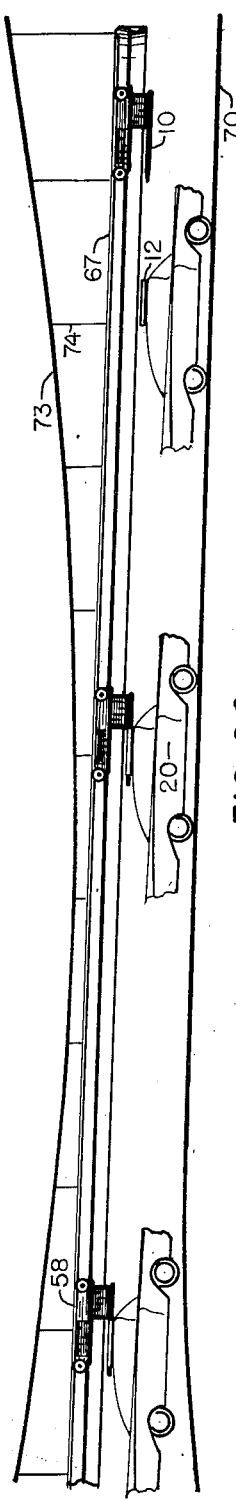
FIGURE 20 is a detail side elevational view of the exit tracks of a station.
Figure 21:
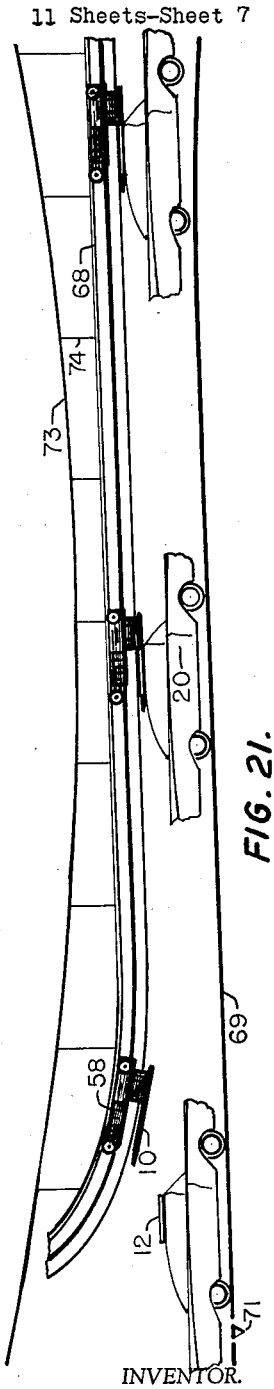
FIGURE 21 is a side elevational view of the station's entrance track and take-off roadway.

FIGURES 18–21 illustrate schematically a switching station where conventionally operated automobiles or similar vehicles equipped with a suspending tube 12 can, without stopping, enter onto or exit from the mono-rail track. As shown in FIGURES 18 and 19 which include a complete station including the approach and departing roadways and tracks, the station has been sectionized into zones a—b, b—c, c—d, d—e, e—f, f—g, and g—h for purposes of description. FIGURE 20 illustrates the exit tracks 67 and the landing roadway 70 shown substantially as they would traverse through the zones c—d and d—e. FIGURE 21 shows the entrance track 68 and take-off roadway 69 shown substantially as they would traverse through the zones e—f and f—g of the zoned station of FIGURES 18 and 19.

Assuming the line of travel as being from the left to the right in these four views, it is seen that a trolley car 58 that has been previously dialed to exit at this station and whose main frame has thus automatically been tilted over and onto this station's exit track 67, will, as it departs from the through mono-rail track 23, and as shown in FIGURES 18 and 19 through zones a—b and b—c, travel a decelerating up-grade before terminating its travel on a down-grade directly over this station's exit or landing roadway 70. Zones b—c and c—d of FIGURE 19 and as detailed in FIGURE 20 are employed where the suspended automobile 20 is shown coming in contact with and landing upon this station's exit or landing roadway 70 to become weightless to the trolley car's carrying arm 10. The removal of the weight of the automobile 20 from the carrying arm 10 allows the air pressure against the tilting fin to complete the maximum tilt of the trolley car, which in turn automatically unlatches the carrying arm from the automobiles suspending tube 12 (assuming the passengers tolls have been paid while in transit) so that the operator of the automobile can release the automobile from the carrying arm by using a slightly braking action which will allow the trolley car and its carrying arm to withdraw forward from its vehicles suspending tube 12 and continue into the maintenance and storage barn 72 while the vehicle or automobile proceeds as a conventionally operated automobile on the exit and landing roadway 70 to a conventional roadway 56.

Once again assuming the line of travel as being from the left to the right in these four views, the automobile 20 having a suspending tube 12 thereon whose operator desires to enter onto and use the monorail track can proceed onto the entrance and take-off roadway 69 at a moderate and specifically designated speed and trip loose a trolley car from within the storage barn 72. This is accomplished by the vehicle passing over an electronically operated road trip 71. The released trolley car will proceed down an incline sufficient to place it immediately in front of the vehicle freely coasting at the designated speed up the gradual incline of the entrance and take-off track 68. This gradually inclined entrance and take-off track as shown is constructed above the station's entrance and take-off roadway 69 so that the suspending tube 12 will overtake and completely encase the trolley car's carrying arm 10 thus assuring complete insertion of the arm 10 into tube 12 as the arm 10 decelerates on thus up-grade zone f—g, to a point where the take-off roadway begins to fall away from the take-off track to place weight upon the trolley car's carrying arm 10 which latches it into the vehicle suspending tube and said latching activates the trolley car's various electrical components and motor to propel it and the suspended vehicle forward on the entrance take-off track to a traffic merging track for its merging onto the through track 23.

FIGURES 22, 23 and 24 illustrate somewhat schematically portions of the trackage with FIGURE 22 illustrating a side elevational view of both the left and right cable suspended monorail track 23 supported from the towers 55 and held in smooth horizontal alignment by suspending rod 74 and cable 73. FIGURE 22 illustrates the suspended automobile first shown travelling on the left track and subsequently on a right track.

FIGURE 23 is a schematic plan of the trackage system in its simplest form with the letters A, B, C, etc. designating destination points, cities or stations as the case may be and the single digit numerals designating the number of switching units or exit stations 67 encountered by the trolley car travelling on each track from destination A. Thus a passenger or operator of a vehicle travelling in suspended relation from the mono-rail track must necessarily first pay the tolls after which the controls are activated and if the operator dials the numeral 1 on the trolley car's distination dial 31 from point A on track A—B in FIGURE 23, the trolley car will automatically tilt over and onto track A—C. Similarly, the dialing of the numeral 2 and then the numeral 1 would automatically have switched the trolley car onto track A—E and the dialing of the numeral 4, then 1 and then 2 would automatically switch the trolley car onto track A—I. This procedure may be extended and a complete network and system of trackage orientated with numerical numbers whereby the dialing system will effectively enable an operator to dial the desination desired and be automatically switched off of the monorail through track 23 when that destination is reached.

FIGURE 24 illustrates a detail plan of the traffic merging track so that the trolley cars carrying an automobile may be merged onto the through track. For purposes of description, the track XX is assumed to already be carrying through traffic so that at any point where a trolley car could have been dialed to switch onto said track, it first shall be run parallel to and at a safe distance from track XX at a decreasing rate of speed adjacent to the sectionized marging track 104 that has means to receive, section-by-section through the merging track inductors 82, an electrical current that is generated, section-by-section on the through track XX by any trolley cars tripping fin dragging over magnetic fields built into the through tracks generating sections 83. Thus, if a trolley car is already travelling on the through track XX positioned so as to be at the point where the merging trolley car running on track A3F would ordinarily enter onto said track XX, the merging trolley car's tripping action is delayed, section-by-section by its tripping fins receipt of the electrical current being generated by the through trolley car running on the through track. This tripping action shall be held delayed until such time that the merging trolley car has decelerated sufficiently so as to be running adjacent to a section of the merging track not receiving an electrical current before it can then complete its tripping action and tilt onto the merging track where, as its trolley contacts with the merging tracks power band 39 which is charged with the same speed producing power as that of the through track XX, the trolley car will again accelerate back to its original speed and that of the through track to hold its position as it merges thereon. Thus, before a merging trolley car can tilt from a merging track onto a through track it must under certain conditions, as shown, first tilt onto and then from a switch-over track 81 which thus necessitates a delaying interval in the operation of the destination solenoids to prevent these trips form being tabulated as will be more fully explained in conjunction with FIGURE 29.

Figure 25:
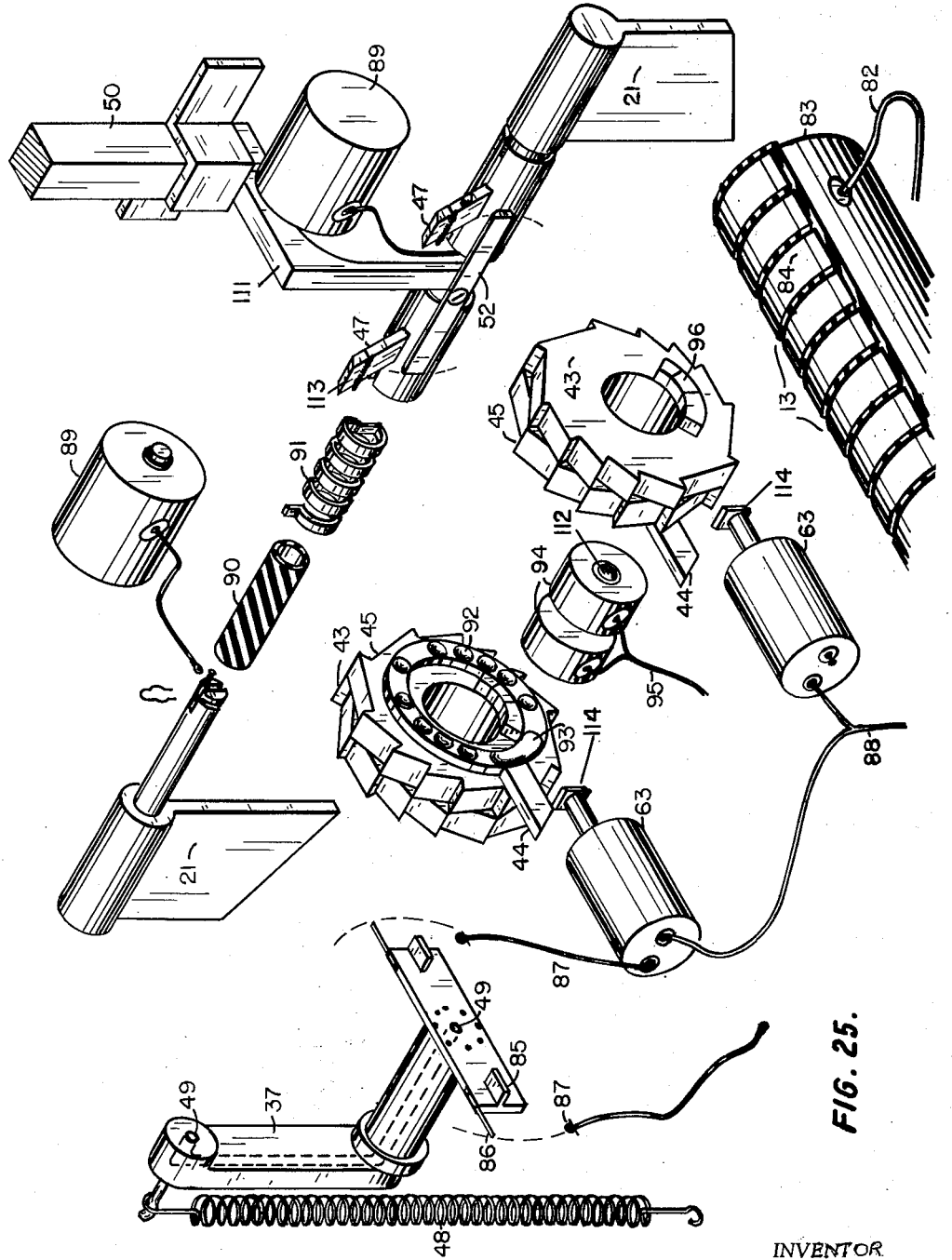
FIGURE 25 is an exploded group perspective view of the tripping and tilt control mechanism for the trolley.

In FIGURE 25 there is an exploded view of the trolley car's tripping and tilt controlling mechanism with a portion of one through track's generating sections 83 shown positioned forward of a tripping fin 21 to more clearly illustrate the method of generating and receiving the trip delaying electrical current. In this structure, there is shown generating magnets 84 positioned upon the running surface 13 of the monorail track so as to be dragged over by the tripping fin 21 to generate an electrical current transmission to a merging track by inductor 82.

Each tripping fin 21 has a bevelled striking plate capable of tripping onto an adjoined track's running surface conducted from the side as well as straight forward and the fins are so pivotally positioned on each side of the tilting frame whereby they will contact and drag upon any monorail track's running surface passing under the trolley car's running wheels. The primary purpose of the fins 21 is to revolve their individual tripper dog 47 provided with a folding tip 113 so that the dogs 47 will move downwardly to contact and revolve each individual control wheel 43 forward one unit with each new passage of an adjoined monorail track. FIGURE 25 also illustrates the track lock mechanism and particularly the unlocking cross-bar 52 so that it requires both tripper dogs to be in the down position for releasing the track lock.

A right and a left trip delaying solenoid 89 is so positioned that their plungers can protrude immediately under the offset 111 of the track lock 50 when in its locked position thereby preventing any unlocking downward movement of the track lock when the solenoids 89 are activated and this prevents downward movement of the second tripper dog 47. The trip delaying solenoids 89 are activated by any electrical current present in any section of the traffic merging track that is picked up and inducted to them through and by the tripping fins 21. This normal tripping action delay of the tripping fin that has contacted an electrically charged merging track section and activated said solenoid 89 to prevent unlocking the track lock 50 and thus prevent the tripper dog movement, is then absorbed into the trip delaying spring 91 located within the tripper housing and insulated from the tripping fin by insulating sleeve 90. The tripping action is thus held temporarily in abeyance until the tripping fin 21 passes onto a section of the merging track not receiving an electrical current which inactivates the trip delaying solenoid to allow the track lock 50 and the tripper dog 47 to then be forced down normally by the released tripping energy of the trip delaying spring. The entire trip delaying procedure assures free passage and spacing of any two trolley cars running upon or merging onto adjoined tracks.

The left and right control wheels 43 operate independently upon a shaft approximately to the tripper dogs 47 so that they will be contacted and revolved one unit for each trip of the tripping fin 21 by its tripper dog 47. The control wheels 43 are unbalanced by the addition of weights 96 so that when free to revolve upon the shaft, they will always retain a position that places their fixed valve rocking arm 44 immediately below the low point attained by the air pressure storage tank's valve cross arm lug 85. The air pressure storage tank's rocker valve 37 which is located within the storage tank is held to either a complete left or right position by the over-center snap spring 48 and this rocker valve is also provided with a small air escape passage 49 through which the air pressure trapped within the closed air passage and tilting chamber can slowly escape.

Disposed between the control wheels and forward of the shaft is the double control wheel position holding solenoid 94 so positioned that its ball tipped plungers 112 will operate in each control wheel unit sockets 92 and double clearing socket 93 to cause friction sufficient to hold the control wheels from revolving by their unbalanced force along when activated through its power inductor 95 when and for as long as the toll is paid.

Located immediately forwardly of and in line with each reversed control cog wheel 45 is a destination solenoid 63 equipped with a folding tip plunger 114 that will reverse the control wheel one unit each time it is extended. Thus, it is seen that while the holding solenoids are activated, for each unit said destination solenoid reverses its control wheel, a like unit must be tabulated by the tripping fin contacting and dragging over an adjoined track, before the control wheel's valve rocker arm is again positioned immediately below the rocker valve cross arm. The destination solenoid 63 shall receive their activating electrical impulses in series of from 1 to 11 (previously dialed on the destination dial 31) as released through the trolley car's main control panel 33, through their single impulse inductor 88 to reverse each individual control wheel the right number of units when on the idle side of the trolley car as dictated by the rocker valve cross arm. As shown, the cross arm solenoid selector contacts 86 completes a circuit, through ground inductors 87, to but the one proper destination solenoid each time so that it alone acts upon the impulses received by both. Also, should the passenger's tolls, that have activated the control wheel's holding solenoids, cease to be paid, said solenoids will release the control wheels to revolve to their unbalanced position and places the valve rocker arm where it will oscillate the rocker valve over on the next trip to tilt the trolley car over and onto the next track or exit with no choice being afforded the non-paying passengers.

Figure 26:
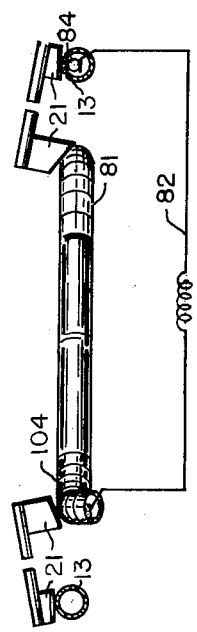
FIGURE 26 is a schematic rear elevational view of the merging track.

FIGURE 26 is a rear schematic view of the merging track 104 and beginning with an incline which will allow the tripping fin 21 of a merging trolley car to make a trip delaying electrical contact with said merging track 104 before making its complete tripping contact thereby a trolley car that has been dialed to trip onto and merge into traffic running on the monorail track's running surface shown to the right will have its trip delayed if necessary.

Figure 27:
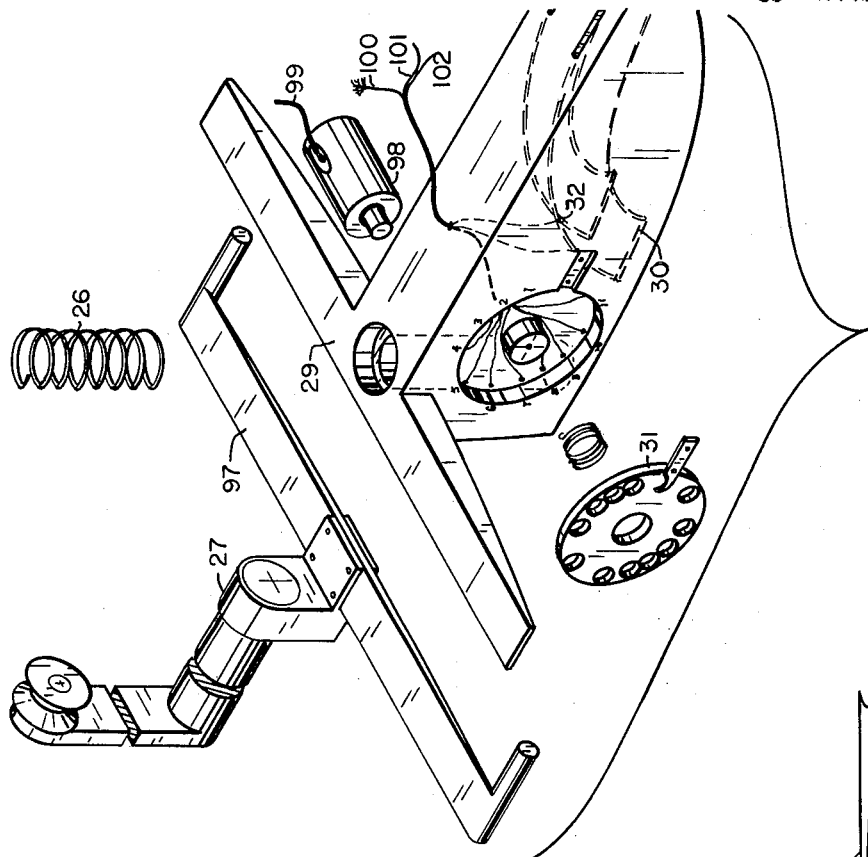
FIGURE 27 is an exploded detail perspective view of the latch for the carrying arm on the trolley.

FIGURE 27 is an exploded view of the latch mechanism 29. The latch is positioned so that it is pivotally supported within the carrying arm 10 and positioned that it can protrude below the carrying arm 10. This will first securely latch the trolley car's carrying arm 10 into the suspending tube 12 and secondly the latch will protrude through the passenger vehicle's top into the passenger compartment to make readily accessible the destination dial 31 and the toll receiving slots 30 for their use while in uninterrupted transit. As shown in FIGURE 27, the impulses dialed on the passenger destination dial 31 shall be transmitted to the trolley car's control panel 33 through inductors 100 as also are the coin toll tabulating impulses through the inductors 101 and 102 from the coin toll contacts 32 located within the coin toll slots.

The latching spring 26 operates to hold the latch 29 down and the rocker 27 is constructed with a flexible cross arm 97 that engages under the rigid lifting arms of the latch to raise it completely up into the carrying arm whenever the trolley car attains its maximum load free tilt by its vertical standing portion that extends up and into the trolley car's arm housing being contacted and forcibly tilted to one side by rocker tracks located therein.

Also shown in FIGURE 27 is the latch freeing solenoid 98 so positioned within the carrying arm 10 that its plunger will extend over the latch to keep it from completely withdrawing up into the carrying arm when not activated by toll payments and whose primary purpose is to keep non-toll paying passenger vehicles latched thereon for manual payment of tolls to an attendant upon exit. The complete rocking movement of the unlatching rocker will then be absorbed into its flexible cross arm.

Figure 28:
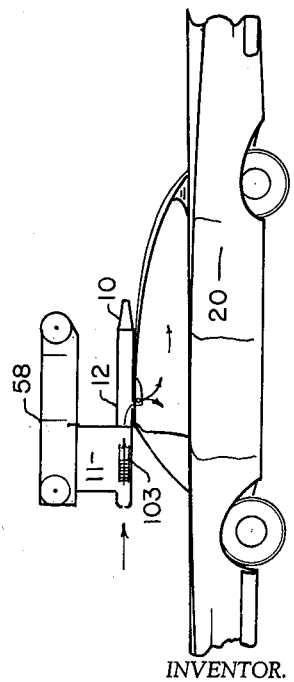
FIGURE 28 is a side elevational view illustrating a trolley connected to a car and having an air passageway into the interior of the vehicle for circulating comfortable conditioned air into the passenger compartment.

FIGURE 28 is a schematic side elevational view for the purpose of illustrating a thermostatically controlled air conditioning unit 103 located within the housing to circulate comfortable conditioned air into the passengers compartment through the vent 107 in the carrying arm latch while travelling in an inoperative vehicle.

Figure 29:
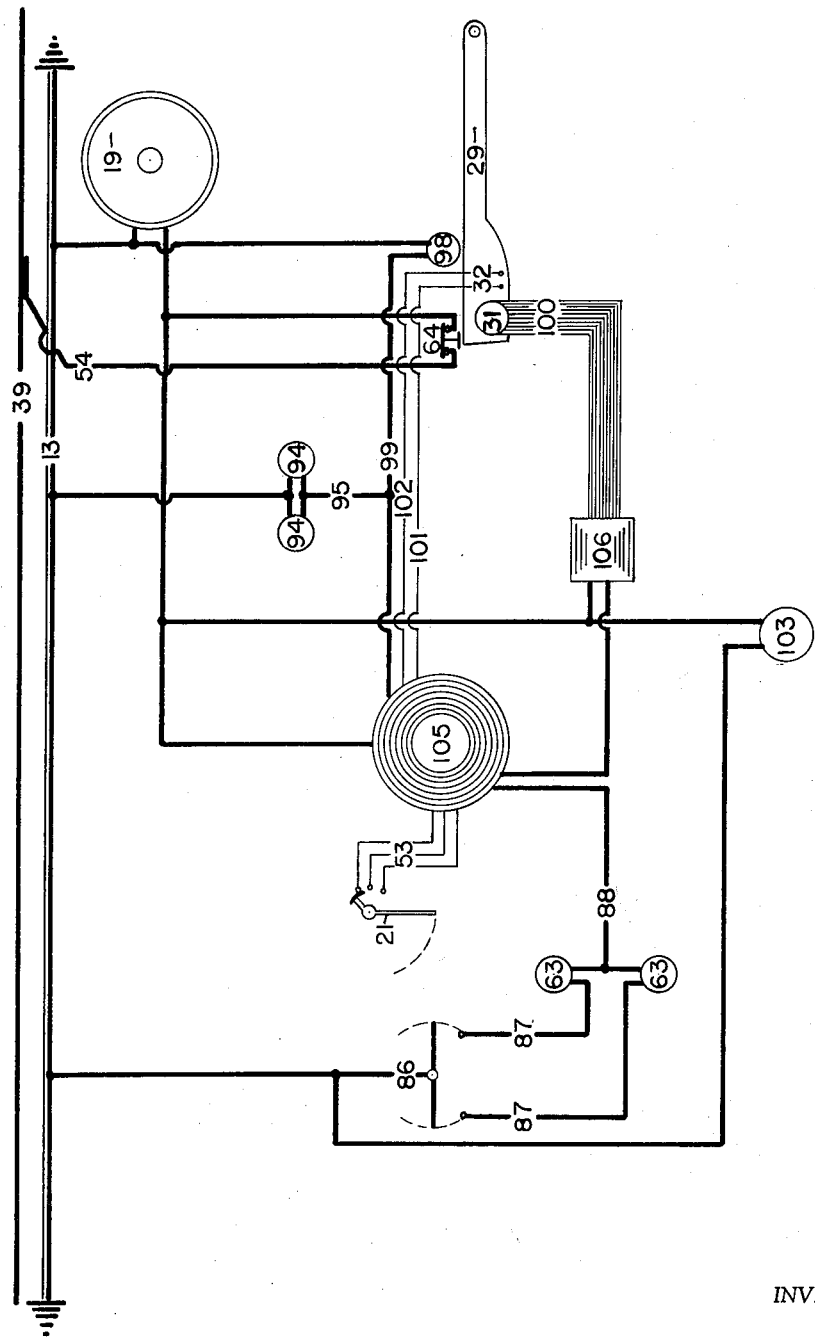
FIGURE 29 is a schematic electric circuit diagram of the trolley car and the relationship of the components thereof.

In FIGURE 29 there is illustrated schematically an electrical circuit diagram which includes the electric power band 39 on which one of the trolley car's trolleys 54 is always in contact and the mono-rail tracks grounded running surface 13 upon which the trolley car's wheels are always in contact to complete a circuit. In this diagram, the trolley car's electrical power is shown being picked up by the sliding trolley 54 and required to pass through closed safety contacts 64, closed only while the latch 29 is operative. This keeps any electrical power from activating the trolley car or its motor when it is in a non-load bearing completely tilted idle state or before its carrying arm is completely encased by the suspending tube 12 and latched thereon. When the contacts 64 are closed, this will activate the trolley car's propelling motor 19 and a dialed impulse stacker 106, an air conditioning unit 103 and a controlling odometer 105.

The controlling odometer 105 is a part of the trolley car's main control panel 33 and includes means to register the miles of travel traversed by the trolley car and to receive and translate each coin toll impulse transmitted through inductor 101 for smaller coins and inductor 102 for larger coins from coin tabulating contacts 32 into miles of paid transport as the coin tolls are inserted into the toll receiving slots 30. This is done by closing an electrical circuit that activates the control wheels double holding solenoid 94 through its inductor 95 and the latch freeing solenoid 98 through its inductor 99 for that number of miles.

The passenger's destination dial 31 is energized through the dialing impulse stacker 106 which is a type of control that has means to receive the number of impulses dialed in each turn of said dial and to stack that number of impulses in a series to subsequently be released from it in that same order and for that same number of impulses each time a completed circuit to the destination solenoid 63 is renewed through the controlling odometer. For this, the controlling odometer has means to hold open this circuit to the destination solenoids at all times excepting for the short interval equal to the maximum 11 dialed impulses, that it lets occur after the trolley car's tripping fin 21 registers through inductor 53 a complete trolley car tilt onto a different track plus a mileage interval sufficient for the rolley car to complete its merging track and switch over track runs and is again running on a through track. By this arrangement of delaying the delivery of the destination impulses until the trolley car is running on a through track, it shall be seen that the maximum three switching and tilting trips necessary to merge said trolley car onto another track will not be tabulated against the dialed destination impulses.

In the interval that the odometer closes the destination solenoid 63 circuit, the impulse stacker 106 shall deliver through inductor 88 the number of impulses previously stacked in that series to the one destination solenoid having a ground circuit through its ground inductor 87 being in contact with the rocker valves cross arm contacts 86.

In operation, when coins are inserted into the toll slots 30 with the coins being of a predetermined value depending upon the toll involved, the coins will activate double control wheel position holding solenoid 94 and the latch freeing solenoid 98. Any suitable type of coin detecting mechanism may be employed for properly determining the coins placed into the slots 30. Switch 64 is the safety switch which will cut off the power of the trolley in the event the latch 29 is not engaged with the tube on the automobile for any reason whtatsoever.

After the toll has been inserted, the destination dial 31 is operated in a predetermined sequence for indicating the destination desired. The odometer will release the stacker after the vehicle and trolley have left the entrance station and, depending upon the number dialed, the stacker will provide that number of impulses to the destination solenoid 63 which will actuate the solenoid the same number of times. For example, if the first number dialed was a four, the solenoid 63 would be actuated four times thus rotating the reverse cogwheel 45 four increments and moving the arm 44 away from the lug 85 of the valve 37 a distance of four increments of movements or notches. When the arm 44 is moved away four increments of movement, it is necesasry that the fins 21 engage four switches which will cause the cogwheel 43 to be moved forward four increments of movement to again bring the arm 44 into engagement with the lug 85 and switch the valve 37 to the opposite position for switching the trolley.

The weights 96 pull the wheels 43 and 45 to a neutral or normal position with the arm 44 adjacent the lug 85. The elements 94 produce friction sufficiently strong to hold the cogwheels 43 and 45 in position until positively moved by either the destination solenoid 63 or the tripper fins 21 by virtue of the dogs 114 or 47. The friction elements 94 are also energized by payment of the toll and, if the toll is not paid, the wheels 43 and 45 will return to their normal position which will cause shifting of the valve 37 at the first switch-off station which is engaged by the tripper fins 21 thus discharging the vehicle from the track at the first switch-off station unless the toll is paid. Latch freeing solenoid 98 will retain the latch 29 engaged with the tube on the automobile until such time as the toll has been paid. Thus if the automobile is switched off at the next station because of non-payment of the toll, the automobile cannot be disengaged from the trolley until such time as the proper toll has been paid thereby eliminating "free riding" from one station to another.

The incline of the take-off track 68 decelerates the coast of the tripper free trolley thus necessitating that the vehicle actually push the trolley up the incline of the track thereby assuring proper and positive interlocking engagement between the arm on the trolley and the tube on the vehicle.

Upon merging, the tripping fin 21 riding on the magnet generators will produce an electric current on the segments of the main track which will be conveyed to two sections of the converging track or merging track 104 as shown in FIGURE 24. Then when the merging trolley has its fins 21 engaging the merging track 104 for shifting onto the merging track 104, the fins 21 will be tripped in the usual manner but will pick up to electrical signal or energy and energize the solenoids 89 for locking the track lock 50. The energy of the fin being tripped will be stored in the spring 91 and as soon as the solenoids 89 are deenergized, the track lock 50 can then be retracted thus permitting the trolley to shift onto the merging track 104 thereby assuring that the trolley on the main track has already proceeded past the merging station. The portion of the track A3F alongside of the merging track 104 will have power reduction mechanism or arrangements for reducing the speed of the merging trolley to allow the trolley on the adjoining track to proceed beyond the merging point a desired distance.

Many and various shapes of the arm and tubes are possible other than oval as shown such as rectangular, square, octagonal or cylindrical with ribs and grooves. Other mechanisms to interlock the arm and tube to prevent relative rotation therebetween may be employed. In this invention, the feature of the trolley shifting from one track to the other is different from a conventional switch in a track where a portion of an adjoining track actually shifts for guiding the trolley onto the other track. In this device, the tracks are permanently adjoined and do not move in relation to each other with the switching operation being carried out by tilting movement of each trolley from one track to the other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for transporting an automobile in elevated relationship to a supporting surface comprising an overhead track assembly, a trolley car longitudinally movably mounted on said track assembly, power means on the trolley car for driving the trolley car along the track assembly at predetermined speed, said trolley car including a longitudinally extending arm thereon, a longitudinally extending tube adapted to be mounted on an automobile or like conveyance for slidably receiving the arm of the trolley car thereby supporting the automobile from the track assembly, and latch means carried by said arm and engageable with the tube for releasably locking the arm within the tube for conveying the automobile on the track assembly with the trolley car providing a propelled unit operable completely independently of the persons in the automobile.

2. The handling apparatus as defined in claim 1 wherein said track assembly includes an overhead mono-rail track having a longitudinal running surface of cylindrical cross-sectional configuration, longitudinally extending power supply bands mounted on the monorail track for supplying power to the power means on the trolley car, said monorail track being suspended by suspension rods connected with suspension cable means that are supported by spaced towers, said suspension rods being adjustable for orientating the track in a desired position.

3. In an automobile handling and conveying apparatus, an overhead monorail track, an automobile suspending trolley car movably mounted on said track, tripper fin means mounted on the trolley car for counting possible exit and switching points for enabling individual selection of destination while in transit, and toll receiving means on the trolley car for receiving toll payments while in transit.

4. The structure as defined in claim 1 wherein said latch means includes a pivotal latch member carried by said arm and swingable about a transverse horizontal axis adjacent the rear end of the arm, said tube having a longitudinal slot in the bottom portion thereof for receiving the latch when in its latched position thereby preventing withdrawal of the arm from the tube and making readily accessible various trolley car controlling components to the interior of the automobile.

5. The structure as defined in claim 4 wherein said latch means includes coin receiving slots through which coins may be inserted for paying a toll, said latch means also includes a vent for admitting thermostatically controlled and conditioned air, and dial means for dialing the destination of the trolley car transporting the automobile or like conveyance.

6. The structure as defined in claim 5 wherein said arm is provided with solenoid lock means for locking the latch means in latched position.

7. The handling apparatus of claim 6 wherein said trolley car includes a vertically disposed housing having the arm mounted on the lower end thereof, a mobile upper frame, front wheels mounted on said frame and rollingly engaging the track assembly, rear driving wheels connected to the power means and rollingly and drivingly engaging the track assembly, means pivotally supporting the vertically disposed housing in relation to the upper frame for pivotal movement about a longitudinal axis, and means interconnecting the arm and the lower end of the vertical housing for rotation of the arm about a longitudinal axis parallel to the longitudinal axis of the pivotal movement of the housing.

8. The structure as defined in claim 7 together with means interconnecting the upper frame and the arm for maintaining a constant angular relationship thereof, said last named means including a compensating chain, a lower sprocket gear engaged by the chain at the lower end thereof, said lower sprocket gear being rigidly attached to said arm, an upper sprocket gear engaged with the upper end of the compensating chain, said upper sprocket gear being rigidly attached to said upper frame.

9. The structure as defined in claim 8 wherein said means for pivoting the housing and frame in relation to each other includes an air chamber carried by the upper frame, a laterally movable fin disposed within the air chamber, a shaft fixed to said housing, said fin being rigid with said shaft, and means for applying pressurized air to said air chamber on selective sides of the fin for pivoting the fin laterally in the chamber thereby pivoting the shaft and pivoting the frame and housing in relation to each other while maintaining the transverse horizontal attitude of the arm in relation to a horizontal axis.

10. The structure as defined in claim 9 wherein said means for supplying air includes an air compressor mounted on the upper frame and driven from an eccentric rotated by the front wheels, and a shiftable valve for selectively admitting pressurized air into opposite sides of the chamber for shifting the fin laterally therein.

11. The structure as defined in claim 1 wherein said automobile handling apparatus includes means mounted on the trolley car for shifting the trolley car from said track assembly to an adjacent track assembly, means disposed below the track assembly for enabling discharge of an automobile from the trolley car, and means disposed adjacent the track assembly for merging trolley cars onto a through track from a merging track in spaced relation to trolley cars already passing along the through track.

12. The structure as defined in claim 11 wherein said means for discharging an automobile from the trolley car includes a roadway surface engageable by the vehicle with the surface of the roadway merging toward the track assembly until the automobile wheels engage the surface of the roadway whereby the removal of its suspended weight from the trolley car disengages the arm latch means, so that the automobile brakes may then be applied and the tube released from the arm thereby disengaging the automobile from the trolley car so that the automobile may be used in a conventional manner and the trolley car subsequently used for carrying another automobile.

13. The structure as defined in claim 12 wherein said means for merging a trolley car onto a through track assembly includes a merging track and a through track which forms part of the track assembly, said merging track and through track including interconnecting means sensing the presence of a trolley car on the through track and retarding a trolley car on the merging track until the trolley car on the through track has moved beyond the point of convergence of the merging track and through track.

14. The structure as defined in claim 13 wherein said means for shifting the trolley car from one track assembly to another includes tripping fins engageable with adjoined tracks, a notched wheel assembly for receiving the movements of the tripper fins, said notched wheel assembly energizing a pneumatically operated tilting device for tilting the upper frame to the left or to the right for discharging or merging a trolley car onto an adjoined track.

15. In an apparatus for handling automobiles by conveying them on an overhead trackway, a trolley car adapted to be movably supported from a trackway and adapted to releasably support an automobile, said trolley car including a main frame having wheel means thereon adapted to engage the overhead trackway, power means on said main frame for driving at least certain of said wheel means for propelling the trolley car in relation to the overhead trackway, a depending housing on the main frame, means connecting the housing to the main frame for pivotal movement about a substantially longitudinal axis parallel to the path of movement of the trolley car, an elongated arm disposed horizontally adjacent the lower end of the housing and means interconnecting the lower end of the housing and the arm for rotatable movement of the arm in relation to the housing with the rotational axis of the arm being parallel to the rotational axis of the housing, said arm including means for locking engagement with an automobile to prevent relative movement therebetween while locked.

16. The trolley car as defined in claim 15 wherein the means connecting the housing to the frame includes a fixed housing shaft, said main frame having a sprocket gear thereon, said means connecting the arm to the housing including a shaft rigid with the arm and having a sprocket gear thereon with the sprocket gears being disposed in vertical alignment, and a compensating chain encircling the sprocket gears and maintaining the arm and main frame in constant angular relation for retaining an automobile in a horizontal plane during relative pivotal movement between the frame and housing.

17. The structure as defined in claim 16 wherein said frame includes a driven air compressor and an air storage tank, an air chamber mounted on said frame and extending longitudinally thereof, a fin laterally movably mounted in said air chamber with one edge of the fin being rigidly connected to the shaft interconnecting the housing and frame, and means for selectively admitting air into the chamber on opposite sides of the fin for pivoting the fin laterally therein thus pivoting the shaft and causing pivotal movement of the arm so that the arm may be maintained in a substantially horizontal position during relative pivotal movement of the frame and housing.

18. In an automobile handling system, a suspension tube mounted at the top portion of an automobile adjacent the center of gravity thereof and extending longitudinally, said suspension tube being mounted at a predetermined elevation above a supporting surface engaged by the supporting wheels of such an automobile, said tube including a longitudinal hollow member of a cross-sectional shape to prevent relative rotation between the tube and a similarly shaped supporting arm when telescopically engaged, said tube also having a longitudinal slot therein for accessibly receiving a controlling latch member on a supporting arm whereby the tube may be locked to such a supporting arm.

19. In an article handling system, an overhead monorail track including a running surface having a transversely curved convex upper surface for engagement by one of a pair of grooved wheels of a trolley car suspended from the track, said track also including a downwardly inclined side plate for limiting the pivotal movement of a suspended trolley car thereby permitting the trolley car to tilt in either direction for switching the other grooved wheel onto a stationary adjoined track while the trolley car is in motion.

20. The method of handling automobiles comprising the steps of driving automobiles sequentially into engagement with individual movable suspension devices, suspending individually from such devices a plurality of automobiles in longitudinal spaced alignment in elevated relationship to the ground surface, conveying the automobiles at a predetermined speed, selectively and automatically discharging individual suspension devices with their respective automobiles at various predetermined destination points, and driving the individual automobiles away from their respective suspension devices.

References Cited in the file of this patent

UNITED STATES PATENTS

| | | |
|---|---|---|
| 1,109,371 | Thunhart | Sept. 1, 1914 |

FOREIGN PATENTS

| | | |
|---|---|---|
| 75,034 | Germany | May 9, 1894 |
| 518,644 | Germany | Feb. 20, 1931 |
| 208,752 | Great Britain | Dec. 31, 1923 |
| 317,953 | Great Britain | Aug. 29, 1929 |